United States Patent
Kim et al.

(10) Patent No.: US 10,663,060 B2
(45) Date of Patent: May 26, 2020

(54) SHIFT LEVER MECHANISM HAVING NEUTRAL RANGE SHIFT LOCK

(71) Applicants: Hyundai Motor Company, Seoul (KR); Kia Motors Corporation, Seoul (KR); SL Corporation, Daegu (KR)

(72) Inventors: Sun Il Kim, Gyeonggi-Do (KR); Eun Sik Kim, Gyeonggi-do (KR); Jee Hyuck Choi, Gyeonggi-do (KR); Jeong Seon Min, Gyeonggi-do (KR); Seong Uk Bae, Gyeonggi-do (KR); Sun Joo Kim, Gyeonggi-do (KR); Jin Won Ko, Gyeonggi-do (KR); Yang Rae Cho, Gyeonggi-do (KR); Man Young Cheon, Gyeongsangbuk-do (KR)

(73) Assignees: Hyundai Motor Company, Seoul (KR); Kia Motors Corporation, Seoul (KR); SL Corporation, Daegu (KR)

( * ) Notice: Subject to any disclaimer, the term of this patent is extended or adjusted under 35 U.S.C. 154(b) by 50 days.

(21) Appl. No.: 15/828,247

(22) Filed: Nov. 30, 2017

(65) Prior Publication Data
US 2018/0245690 A1    Aug. 30, 2018

(30) Foreign Application Priority Data
Feb. 24, 2017   (KR) .................. 10-2017-0025028

(51) Int. Cl.
| F16H 61/20 | (2006.01) |
| F16H 61/22 | (2006.01) |
| F16H 59/10 | (2006.01) |

(52) U.S. Cl.
CPC ............. *F16H 61/22* (2013.01); *F16H 59/10* (2013.01)

(58) Field of Classification Search
CPC ........... F16H 61/22; F16H 59/10; F16H 61/26
See application file for complete search history.

(56) References Cited

U.S. PATENT DOCUMENTS

| 5,257,551 | A | * | 11/1993 | Iwata | ........... B60R 25/066 192/220.2 |
| 5,311,962 | A | * | 5/1994 | Nakano | ............ B60N 2/22 180/271 |
| 5,431,267 | A | * | 7/1995 | Togano | ............ F16H 59/10 180/271 |
| 5,489,246 | A | * | 2/1996 | Moody | ............ F16H 59/10 192/220.2 |
| 5,582,073 | A | * | 12/1996 | Takeuchi | ............ F16H 59/10 116/28.1 |
| 5,722,517 | A | * | 3/1998 | Sayama | ............ B60T 7/10 188/353 |

(Continued)

FOREIGN PATENT DOCUMENTS

KR   10-2005-0022378   3/2005

*Primary Examiner* — Zakaria Elahmadi
(74) *Attorney, Agent, or Firm* — Mintz Levin Cohn Ferris Glovsky and Popeo, P.C.; Peter F. Corless (57) ABSTRACT

A shift lever mechanism has a neutral (N) range shift lock, the shift lever mechanism configured such that when shifting from a drive (D) range to a park (P) range, rotation of a shift lever is confined to the N range, and then, when a shift condition to the P range is satisfied, the shift lever is rotated to allow shifting to the P range, thereby preventing damage to a parking mechanism due to driver error when shifting to the P range.

8 Claims, 5 Drawing Sheets

(56) References Cited

U.S. PATENT DOCUMENTS

| | | | | |
|---|---|---|---|---|
| 5,797,295 A * | 8/1998 | Kataumi | ................. | F16H 59/10 |
| | | | | 192/220.3 |
| 5,993,353 A * | 11/1999 | Chung | .................... | F16H 59/10 |
| | | | | 192/218 |
| 6,189,398 B1 * | 2/2001 | Kataumi | ................. | F16H 59/10 |
| | | | | 74/423 |
| 6,325,196 B1 * | 12/2001 | Beattie | ................ | F16H 59/0204 |
| | | | | 192/220.4 |
| 6,339,968 B1 * | 1/2002 | Nagashima | ............. | F16H 59/10 |
| | | | | 192/220.3 |
| 6,345,521 B1 * | 2/2002 | Suzuki | .................... | F16H 59/10 |
| | | | | 70/247 |
| 6,575,049 B1 * | 6/2003 | Hasegawa | ............... | F16H 59/10 |
| | | | | 74/473.1 |
| 7,568,404 B2 * | 8/2009 | Grossman | ........... | F16H 59/0204 |
| | | | | 74/473.21 |
| 2002/0116966 A1 * | 8/2002 | Suzuki | ............. | B60R 25/02144 |
| | | | | 70/247 |
| 2006/0032723 A1 * | 2/2006 | Wilber | .................... | F16H 61/22 |
| | | | | 192/220.4 |
| 2007/0000294 A1 * | 1/2007 | Umeda | .................... | F16H 61/22 |
| | | | | 70/195 |
| 2017/0184195 A1 * | 6/2017 | Kato | .................... | F16H 59/0278 |
| 2017/0335957 A1 * | 11/2017 | Abu-Soud | ............... | F16H 61/22 |
| 2018/0223991 A1 * | 8/2018 | Royer | .................... | F16H 61/22 |

\* cited by examiner

SHIFT LEVER MECHANISM HAVING NEUTRAL RANGE SHIFT LOCK

CROSS REFERENCE TO RELATED APPLICATION

The present application claims under 35 U.S.C. § 119(a) the benefit of Korean Patent Application No. 10-2017-0025028, filed Feb. 24, 2017, the entire contents of which are incorporated by reference herein.

BACKGROUND

(a) Technical Field

The present disclosure relates to a shift lever mechanism having a neutral (N) range shift lock, the shift lever mechanism capable of preventing shifting from being performed directly to a park (P) range when shifting from a drive (D) range or the N range to the P range.

(b) Description of the Related Art

In a conventional automatic transmission vehicle, P, R, N, and D ranges (i.e., park, reverse, neutral, and drive ranges) are usually linearly arranged, and the shift lever is rotated to select any one of the plurality of ranges. When the shift lever is rotated, a cable is pulled and the operation force thereof is transmitted to the transmission.

In particular, when shifting to the P range, the shift must be made to the P range with the vehicle completely stopped, but the conventional shift lever may be shifted to the P range in a state where the vehicle is not completely stopped. In other words, usually when shifting to the P range, the shift lever is moved to the P range by pressing a separate parking button. However, while driving in the D range, the shift can be performed directly to the P range by pressing the parking button due to driver error.

When shifting is performed from the D range directly to the P range, the shift is performed to the P range in a state where the vehicle is not completely stopped, whereby a parking gear and a reducer casing for parking the vehicle may be damaged.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a shift lever mechanism having an N range shift lock, in which shifting is prevented from being performed from a D range directly to a P range, thereby preventing damage to a parking mechanism operated when shifting to the P range.

In order to achieve the above object, according to one aspect of the present disclosure, there is provided a shift lever mechanism having an N range shift lock, the shift lever mechanism including: a lever housing rotatably provided with a shift lever selecting a predetermined shift range of P, R, N, and D ranges; an engaging lever configured to be integrally moved along with the shift lever, and provided with a stop portion with respect to the D, N, and P ranges; and a latching mechanism provided in the lever housing to correspond to the stop portion, configured to allow a rotation of the engaging lever between the P and N ranges or confine the rotation thereof.

The stop portion of the engaging lever may include: a first stop groove extending in a rotational direction of the shift lever between the D and N ranges, and formed in a concave shape such that the latching mechanism is latched therein; a plane portion corresponding to the R range, and formed in a planar shape such that the latching mechanism is prevented from being stopped thereby; and a second stop groove corresponding to the P range, and formed in a concave shape such that the latching mechanism is latched therein.

The latching mechanism may be a solenoid provided with a stop pin configured to be pulled out in a direction toward the engaging lever or pulled in an opposite direction, and the rotation of the engaging lever may be confined when the stop pin is pulled out and stopped by the stop portion.

The lever housing may be provided with a through-hole at a location corresponding to the stop portion of the engaging lever, the latching mechanism may be fixedly provided in the lever housing and includes a casing with a solenoid coupled thereto, and a stop pin of the solenoid may be pulled out toward the engaging lever through the through-hole.

The engaging lever may be provided with a movable pin configured to move up and down in conjunction with a button provided in the shift lever, and the lever housing may be provided with a latching space with the movable pin moving therein, the latching space being configured such that movement of the movable pin is confined at a predetermined shift range of the P, R, N, and D ranges.

The latching space of the lever housing may include: a first stopper at which the movable pin is disposed when the shift lever selects the D range or the N range; a second stopper at which the movable pin is disposed when the shift lever selects the R range, the second stopper protruding more than the first stopper; a third stopper at which the movable pin is disposed when the shift lever selects the P range; and a stop protrusion being provided between the second stopper and the third stopper, and protruding more than the second stopper.

The movable pin of the shift lever may be elastically supported by a spring.

The shift lever mechanism may further include a controller controlling operation of the latching mechanism, wherein the controller is configured to control the operation of the latching mechanism by receiving an operation signal of a brake pedal, and the rotation of the engaging lever is allowed by the latching mechanism when the operation signal of the brake pedal is generated.

The controller may be configured to control the operation of the latching mechanism by further receiving an operation signal of a button provided in the shift lever, and to control the latching mechanism to allow the rotation of the engaging lever when both the operation signal of the brake pedal and the operation signal of the button are generated.

The controller may be configured to control the operation of the latching mechanism by further receiving vehicle speed information, and to control the latching mechanism to allow the rotation of the engaging lever when a vehicle speed is equal to or less than a preset speed in addition to generation of the operation signal of the brake pedal and the operation signal of the button.

According to the shift lever mechanism having an N range shift lock configured as described above, when shifting is performed from the D range to the P range, the rotation of the shift lever is confined to the N range, and then when the shift condition to the P range is satisfied, the shift lever is rotated to allow shifting to the P range, thereby preventing damage to the parking mechanism due to driver error when shifting to the P range.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a shift lever mechanism having a neutral (N) range shift lock according to an exemplary embodiment of the present disclosure will be described in detail with reference to the accompanying drawings.

Figure 1:
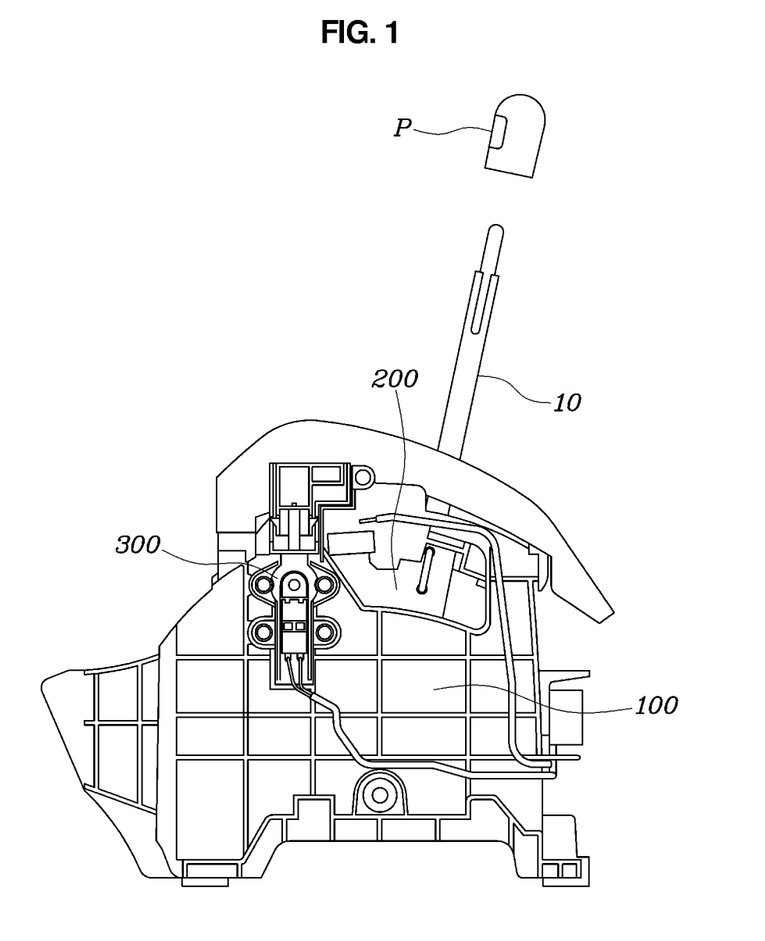
FIG. 1 is a view showing a shift lever mechanism having a neutral (N) range shift lock according to an embodiment of the present disclosure.
Figure 2:
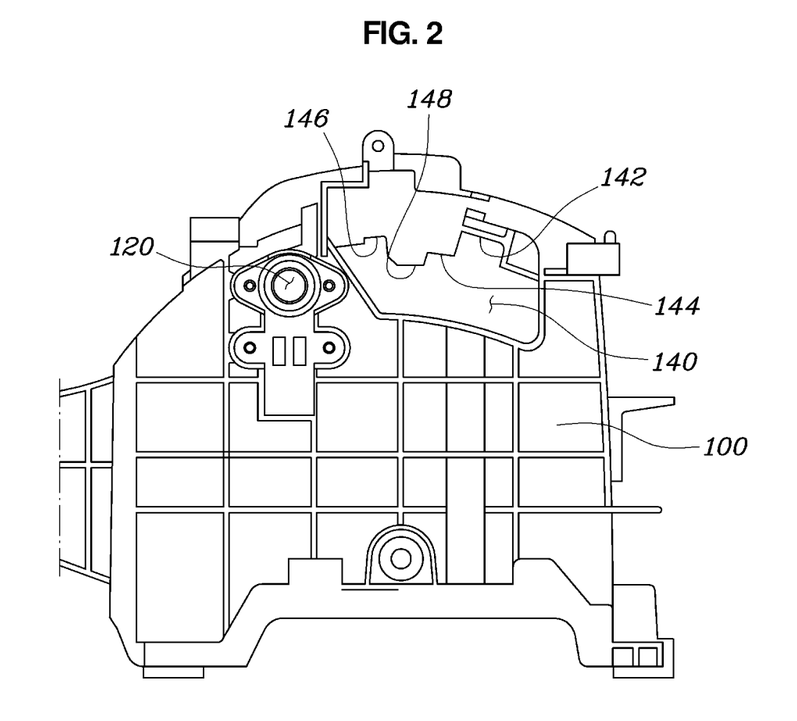
FIG. 2 is a view showing a lever housing of the shift lever mechanism having the N range shift lock shown in FIG. 1.
Figure 3:
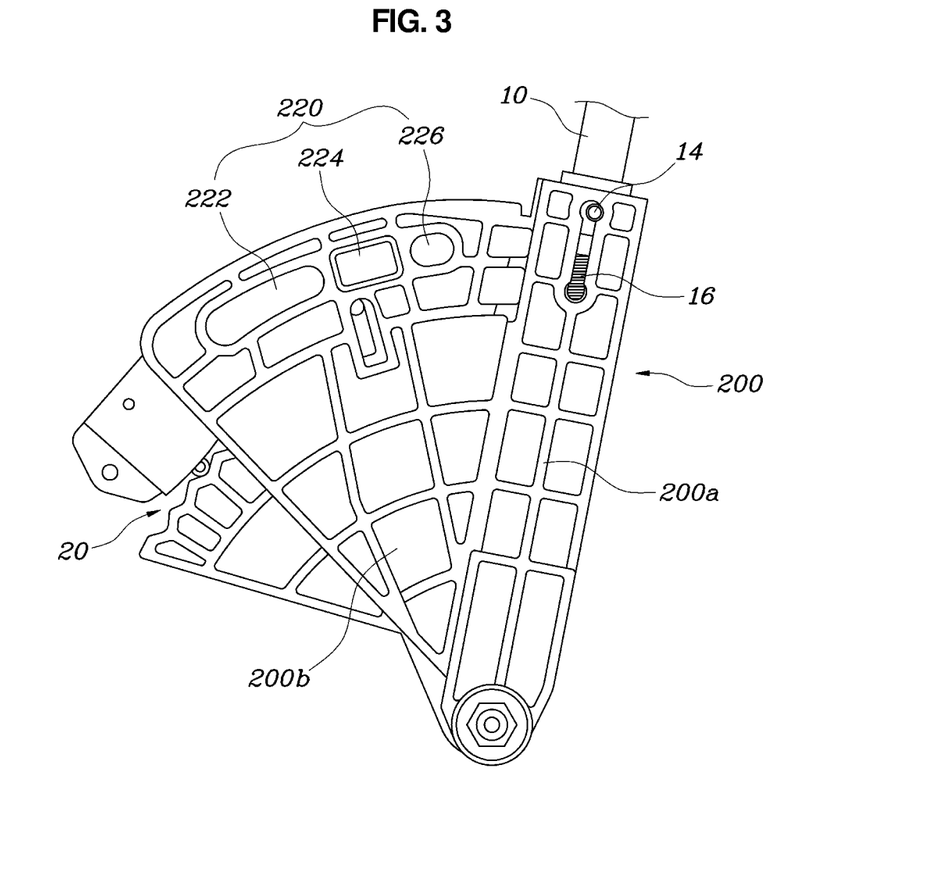
FIG. 3 is a view showing an engaging lever of the shift lever mechanism having the N range shift lock shown in FIG. 1.
Figure 4:
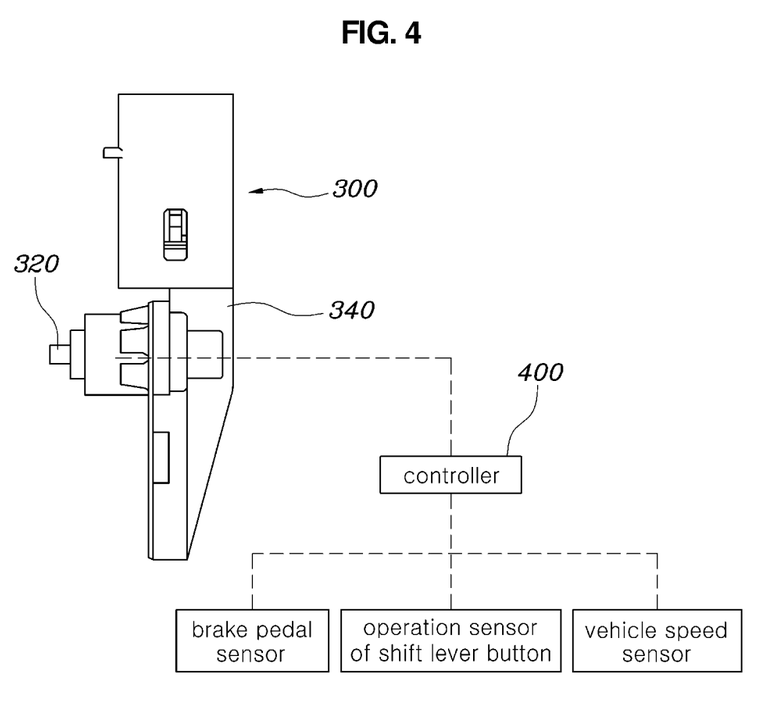
FIG. 4 is a view showing a latching mechanism of the shift lever mechanism having the N range shift lock shown in FIG. 1.
Figure 5:
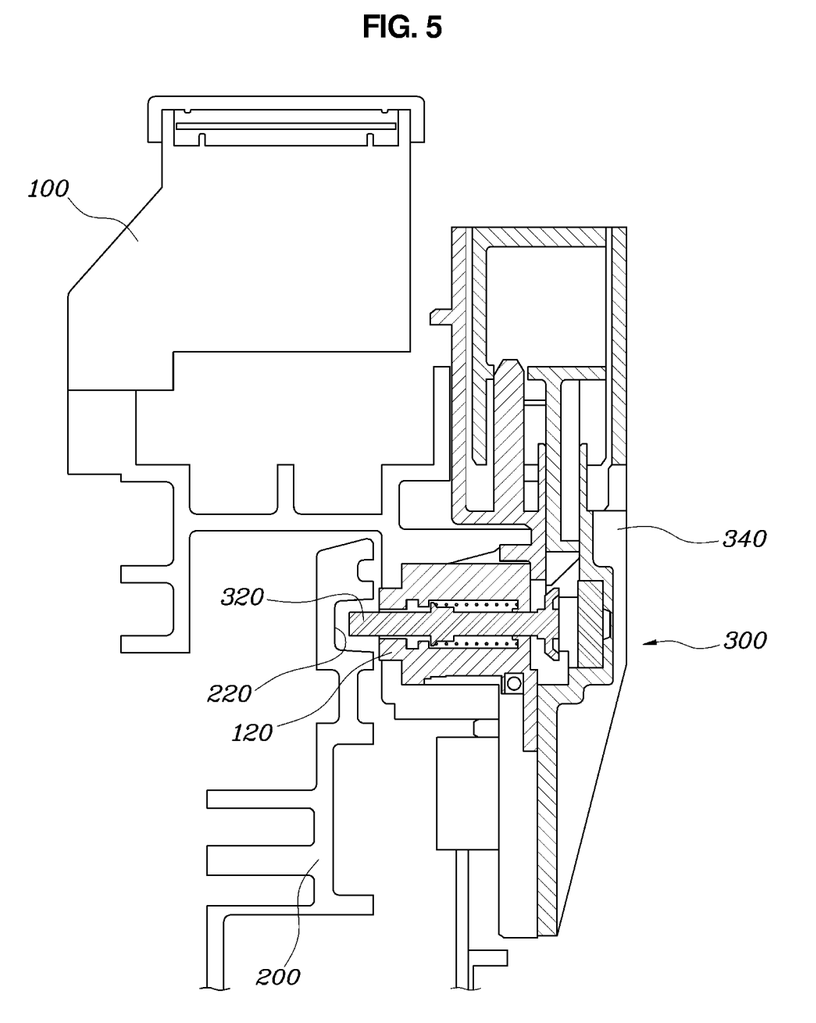
FIG. 5 is a view to illustrate the shift lever mechanism having the N range shift lock shown in FIG. 1.

FIG. 1 is a view showing a shift lever mechanism having an N range shift lock according to an embodiment of the present disclosure; FIG. 2 is a view showing a lever housing of the shift lever mechanism having the N range shift lock shown in FIG. 1; FIG. 3 is a view showing an engaging lever of the shift lever mechanism having the N range shift lock shown in FIG. 1; FIG. 4 is a view showing a latching mechanism of the shift lever mechanism having the N range shift lock shown in FIG. 1; and FIG. 5 is a view to illustrate the shift lever mechanism having the N range shift lock shown in FIG. 1.

As shown in FIG. 1, the shift lever mechanism having the N range shift lock according to the present disclosure includes: a lever housing 100 rotatably provided with a shift lever 10 selecting a predetermined shift range of P, R, N, and D ranges; an engaging lever 200 configured to be integrally moved along with the shift lever 10, and provided with a stop portion 220 with respect to the D, N, and P ranges; and a latching mechanism 300 provide in the lever housing 100 to correspond to the stop portion 220, and configured to allow a rotation of the engaging lever 200 between the P and N ranges or confine the rotation thereof.

The present disclosure may be applied to a transmission apparatus, in which the P, R, N, and D stages are arranged linearly and shift is performed when the shift lever 10 is operated in the forward and backward directions. In particular, in the case of a transmission structure in which the shift lever 10 is linearly operated in the forward and backward directions, the shifting can be performed from the D range directly to the P range by the erroneous operation of the driver, which may cause a problem that the components constituting the parking mechanism are damaged as the parking mechanism is operated while the vehicle is running.

The present disclosure is intended to solve this problem, and is configured such that the shift lever 10 along with the engaging lever 200 is rotatably provided in the lever housing 100. Particularly, the engaging lever 200 is provided with the stop portion 220 with respect to the D, N, and P ranges, and the lever housing 100 is provided with the latching mechanism 300 corresponding to the stop portion 220, such that the latching mechanism 300 confines the rotation of the engaging lever 200 between the P and N ranges, thereby preventing the rotation of the shift lever 10.

In other words, in the state where the shift lever 10 is placed in the D range, when the shift lever 10 is shifted directly toward the P range due to driver error, the latching mechanism 300 is latched in the stop portion 220 of the engaging lever 200 in the N range, thereby confining the rotation of the engaging lever 200. Accordingly, when the shift lever 10 is shifted directly toward the P range in the D range, the movement of the shift lever 10 is confined in the N range, along with the engaging lever 200, whereby the components of the parking mechanism is prevented from being damaged due to shifting to the P range during driving. Further, the latching mechanism 300 performs a shift lock function when shifting is performed from the P range to another range. By using the latching mechanism 300 provided to perform a shift lock function, it is possible to control limiting excessive P range shifting without adding additional hardware.

As shown in FIG. 3, the engaging lever 200 may be rotatably hinged to the lever housing 100, and may include: a rotating portion 200a with the shift lever 10 coupled thereto; and a connection portion 200b coupled to the rotating portion 200a, formed to be in an arc shape, and provided with the stop portion 220. In other words, the engaging lever 200 is hinged to the lever housing 100 to be rotatable, whereby it is rotatable in conjunction with the operation of the shift lever 10 coupled to the rotating portion 200a of the engaging lever 200. The rotating portion 200a may be provided with a movable pin 14 provided in the shift lever 10, and the movable pin 14 may be elastically supported by a spring 16. Herein, the movable pin 14 may move up and down in conjunction with a button 12 provided in the shift lever 10, or may move in a latching space 140 of the lever housing 100, which will be described hereinafter. The button 12 may be provided in a shift knob coupled to the shift lever 10. Usually, the shift lever 10 is provided with a knob, and the knob is provided with the button 12. The specific operation structure is omitted.

Further, the rotating portion 200a of the engaging lever 200 may be provided with the arc-shaped connection portion 200b, and the connection portion 200b may be provided with the stop portion 220. In other words, the stop portion 220 is formed to extend in a rotational direction of the shift lever 10, so the stop portion is provided in the arc-shaped connection portion 200b, and a detent structure 20 may be applied to the connection portion 200b to give an operation feeling according to the operation of the shift lever 10.

Meanwhile, the stop portion 220 of the engaging lever 200 includes: a first stop groove 222 extending in the rotational direction of the shift lever 10 between the D and N ranges, and formed in a concave shape such that the latching mechanism 300 is latched therein; a plane portion 224 corresponding to the R range, and formed in a planar shape such that the latching mechanism 300 is prevented from being stopped thereby; and a second stop groove 226 corresponding to the P range, and formed in a concave shape such that the latching mechanism 300 is latched therein.

As described above, the stop portion 220 of the engaging lever 200, as shown in FIG. 3, includes the first stop groove 222 corresponding to the D range and the N range, the plane portion 224 corresponding to the R range, and the second stop groove 226 corresponding to the P range, wherein the first stop groove 222, the plane portion 224, and the second stop groove 226 may be sequentially arranged in the rotational direction of the shift lever. Herein, the first stop groove 222 is formed to be an oblong groove such that the D range and the N range communicate with each other, whereby even if the latching mechanism 300 are latched in the first stop groove 222, the shift lever can be moved within the D range and the N range. However, when the shift is performed from the D range to the P range, the latching mechanism 300 is latched in the first stop groove 222 to be prevented from moving, and when the rotation of the engaging lever 200 is allowed by the latching mechanism 300 unlatched from the first stop groove 222, it is possible to shift to the P range through the operation of the shift lever 10. Thereby, it is possible to prevent shifting from being performed from the D range directly to the P range.

On the contrary, when the shift is performed from the P range to another range, the latching mechanism 300 is latched in the second stop groove 226 so the shift lock state is maintained, and when the rotation of the engaging lever 200 is allowed by the latching mechanism 300 unlatched from the second stop groove 226, it is possible to shift to another range through the operation of the shift lever 10.

The plane portion 224 corresponding to the R range is formed to be in plane with the cross section of the engaging lever 200 such that the latching mechanism 300 fails to confine the rotation of the engaging lever 200 in the R range, whereby it is possible to move the shift lever 10 from the N range to the P range, or from the P range to the N range. In other words, during the operation of the shift lever 10, if the latching mechanism 300 is latched in the R range to confine the rotation of the engaging lever 200, the vehicle may be driven backward, contrary to the driver's intention. Thus, the plane portion 224 corresponding to the R range is provided.

Meanwhile, as shown in FIG. 4, the latching mechanism 300 may be a solenoid provided with a stop pin 320 configured to be pulled out in a direction toward engaging lever 200 or pulled in an opposite direction, and the rotation of the engaging lever 200 may be confined when the stop pin 320 is pulled out and stopped by the stop portion 220. In other words, the latching mechanism 300 is the solenoid, which may be configured such that the stop pin 320 as a plunger is pulled out in the direction toward the engaging lever or pulled in the opposite direction, wherein normally, the stop pin 320 is pulled out so as to be latched in the stop portion 220, and in certain situations, the stop pin 320 is pulled in so as to be separated from the stop portion 220. Herein, the latching mechanism 300 may be controlled by a controller, which will be described hereinafter, and may be electrically connected through a connector and an electrical wire.

In particular, as shown in FIGS. 2 and 5, the lever housing 100 may be provided with a through-hole 120 at a location corresponding to the stop portion 220 of the engaging lever 200; the latching mechanism 300 may be fixedly provided in the lever housing 100, and may include a casing 340 with a solenoid coupled thereto; and the stop pin 320 of the solenoid may be pulled out toward the engaging lever 200 through the through-hole 120.

As described above, the latching mechanism 300 is coupled to the lever housing 100 through the casing 340 provided to cover the through-hole 120 of the lever housing 100, and the stop pin 320 of the latching mechanism 300 is pulled out toward the engaging lever 200 through the through-hole 120, thereby being latched in the stop portion 220. Since the lever housing 100 is provided with the through-hole 120 and the latching mechanism 300 is provided through the casing 340, the engaging lever 200 and the latching mechanism 300 cannot interfere with each other in the lever housing 100, and the stop pin 320 of the latching mechanism 300 can be latched in the stop portion 220 provided in the engaging lever 200.

Meanwhile, the engaging lever 200 may be provided with the movable pin 14 configured to move up and down in conjunction with the button 12 provided in the shift lever 10, the lever housing 100 may be provided with the latching space 140 with the movable pin 14 moving therein, and the latching space 140 may be configured such that movement of the movable pin 14 is confined at a predetermined shift range of the P, R, N, and D ranges.

Herein, the latching space 140 of the lever housing 100 may include: a first stopper 142 at which the movable pin 14 is disposed when the shift lever 10 selects the D range or the N range; a second stopper 144 at which the movable pin 14 is disposed when the shift lever 10 selects the R range, the second stopper protruding more than the first stopper 142; a third stopper 146 at which the movable pin 14 is disposed when the shift lever 10 selects the P range; and a stop protrusion 148 being provided between the second stopper 144 and the third stopper 146, and protruding more than the second stopper 144.

As shown in FIG. 2, the latching space 140 of the lever housing 100 is constituted by the first stopper 142, the second stopper 144, the third stopper 146, and the stop protrusion 148, wherein the movable pin 14 provided in the engaging lever 200 is disposed one of the first stopper 142, the second stopper 144, and the third stopper 146 according to the movement of the shift lever 10 in the latching space 140. Herein, the button 12 provided in the shift lever 10 may be provided in the shift knob, and the movable pin 14 may be elastically supported by the spring 16, such that the state where the movable pin is brought into contact with the first, the second, and the third stoppers of the latching space 140 is maintained.

Accordingly, when the shift lever 10 selects the D range or the N range, the movable pin 14 is disposed at the first stopper 142, and the first stopper 142 is formed such that the D range area and the N range area communicate with each other, whereby when the shift lever 10 is operated from the D range to the N range or from the N range to the D range, it is possible to perform the shift without pressing the button 12. However, when the shift is performed from the D range or the N range to the R range or the P range, the shift is performed only when pressing the button 12. To achieve this, the second stopper 144 corresponding to the R range is formed to be more protruding than the first stopper 142 to distinguish the first stopper 142 from the second stopper 144, and the third stopper 146 corresponding to the P range is distinguished from the second stopper 144 by the stop protrusion 148 more protruding than second stopper 144.

Thereby, when shifting by operating the shift lever 10, the D range or the N range can be shifted in the first stopper 142 without pressing the button 12, and when the shift is performed to the R range or the P range, the button 12 should be pressed such that the movable pin 14 is moved within the latching space 140 to allow the rotation of the shift lever 10, and thus, it is possible to prevent erroneous shift.

Meanwhile, as shown in FIG. 4, the shift lever mechanism further includes a controller 400 controlling operation of the latching mechanism 300. Herein, the controller 400 may be configured to control the operation of the latching mechanism 300 by receiving an operation signal of a brake pedal, wherein the rotation of the engaging lever 200 is allowed by the latching mechanism 300 when the operation signal of the brake pedal is generated.

As described above, the latching mechanism 300 is operated by the controller 400, and the controller 400 controls the latching mechanism 300 to be operated only when the operation signal of the brake pedal is generated, thereby allowing or confining the rotation of the engaging lever 200.

In particular, in the state where the shift lever 10 is disposed at the D range, when the shift lever 10 is shifted to the P range due to driver error, the shift lever 10 is allowed to be shifted only to the N range by the latching mechanism 300. In other words, the latching mechanism 300 is latched in the stop portion 220 of the engaging lever 200, whereby it is possible to limit the movement of the shift lever 10. Thereby, the shift by the erroneous operation of the driver is prevented. When the operation signal of the brake pedal is input to the controller 400 in response to the operation of the brake pedal, the latching mechanism 300 is operated to be separated from the stop portion 220, and the shift to P range can be performed according to the operation of the brake pedal only when the vehicle is stopped.

Meanwhile, the controller 400 may be configured to control the operation of the latching mechanism 300 by further receiving an operation signal of the button 12 provided in the shift lever 10, and to control the latching mechanism 300 to allow the rotation of the engaging lever 200 when both the operation signal of the brake pedal and the operation signal of the button 12 are generated.

Further, the controller 400 may be configured to control the operation of the latching mechanism 300 by further receiving vehicle speed information, and to control the latching mechanism 300 to allow the rotation of the engaging lever 200 when a vehicle speed is equal to or less than a preset speed in addition to generation of the operation signal of the brake pedal and the operation signal of the button 12.

As described above, the controller 400 may further receive the vehicle speed information in addition to the operation signal of the brake pedal and the operation signal of the button 12 provided in the shift lever 10, and may control the operation of the latching mechanism 300 to allow the rotation of the engaging lever 200 when the vehicle speed is equal to or less than the preset speed in addition to generation of the operation signal of the brake pedal and the operation signal of the button 12.

In other words, as the latching mechanism 300 is latched in the stop portion 220 of the engaging lever 200, the shift from the N range to the P range is limited. In order to allow this, the following conditions should be satisfied: the vehicle is stopped by operating the brake pedal; the shift to the P range is performed according to the intention of the driver by inputting the operation signal of the button 12 provided to the shift lever 10; and the vehicle is stopped as the vehicle speed is equal to or less than the preset speed.

The controller 400 is configured to receive each information from a brake pedal sensor, an operation sensor of the button 12 of the shift lever 10, and a vehicle speed sensor, and to allow the shift to the P range when the vehicle is stopped by controlling the latching mechanism 300 to be unlatched from the stop portion 220 in the condition where the vehicle speed is equal to or less than the preset speed in addition to generation of the operation signal of the brake pedal and the operation signal of the button 12.

According to the shift lever mechanism having N range shift lock configured as described above, when the shift from the D range to the P range is performed, the rotation of the shift lever 10 is confined to the N range, and then, when the shift condition to the P range is satisfied, the shift lever 10 is rotated to allow shifting to the P range, thereby preventing damage to the parking mechanism due to driver error when shifting to the P range.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A shift lever mechanism having a neutral (N) range shift lock, the shift lever mechanism comprising:
   a lever housing rotatably provided with a shift lever selecting a predetermined shift range of park (P), reverse (R), neutral (N), and drive (D) ranges;
   an engaging lever configured to be integrally moved along with the shift lever, and provided with a stop portion with respect to the D, N, and P ranges; and
   a latching mechanism provide in the lever housing to correspond to the stop portion, configured to allow a rotation of the engaging lever between the P and N ranges or confine the rotation thereof, wherein the lever housing is provided with a through-hole at a location corresponding to the stop portion of the engaging lever, wherein the latching mechanism is fixedly provided in the lever housing and includes a casing with a solenoid coupled thereto, wherein a stop pin of the solenoid is pulled out toward the engaging lever through the through-hole, wherein the casing is provided separately from the lever housing to cover the through-hole of the lever housing and the latching mechanism is coupled to the lever housing through the casing, wherein the stop portion of the engaging lever includes:
- a first stop groove extending in a rotational direction of the shift lever between the D and N ranges, and formed in a concave shape such that the latching mechanism is latched therein;
- a plane portion corresponding to the R range, and formed in a planar shape such that the latching mechanism is prevented from being stopped thereby; and
- a second stop groove corresponding to the P range, and formed in a concave shape such that the latching mechanism is latched therein, and wherein the first stop groove is formed to be an oblong groove such that the D range and the N range communicate with each other, whereby even if the latching mechanism are latched in the first stop groove, the shift lever is able to be moved within the D range and the N range.

2. The shift lever mechanism of claim 1, wherein the latching mechanism is a solenoid provided with a stop pin configured to be pulled out in a direction toward the engaging lever or pulled in an opposite direction, and the rotation of the engaging lever is confined when the stop pin is pulled out and stopped by the stop portion.

3. The shift lever mechanism of claim 1, wherein the engaging lever is provided with a movable pin configured to move up and down in conjunction with a button provided in the shift lever, and the lever housing is provided with a latching space with the movable pin moving therein, the latching space being configured such that movement of the movable pin is confined at a predetermined shift range of the P, R, N, and D ranges.

4. The shift lever mechanism of claim 3, wherein the latching space of the lever housing includes:
- a first stopper at which the movable pin is disposed when the shift lever selects the D range or the N range;
- a second stopper at which the movable pin is disposed when the shift lever selects the R range, the second stopper protruding more than the first stopper;
- a third stopper at which the movable pin is disposed when the shift lever selects the P range; and
- a stop protrusion being provided between the second stopper and the third stopper, and protruding more than the second stopper.

5. The shift lever mechanism of claim 4, wherein the movable pin of the shift lever is elastically supported by a spring.

6. The shift lever mechanism of claim 1, further comprising:
- a controller controlling operation of the latching mechanism, wherein the controller is configured to control the operation of the latching mechanism by receiving an operation signal of a brake pedal, and the rotation of the engaging lever is allowed by the latching mechanism when the operation signal of the brake pedal is generated.

7. The shift lever mechanism of claim 6, wherein the controller is configured to control the operation of the latching mechanism by further receiving an operation signal of a button provided in the shift lever, and to control the latching mechanism to allow the rotation of the engaging lever when both the operation signal of the brake pedal and the operation signal of the button are generated.

8. The shift lever mechanism of claim 7, wherein the controller is configured to control the operation of the latching mechanism by further receiving vehicle speed information, and to control the latching mechanism to allow the rotation of the engaging lever when a vehicle speed is equal to or less than a preset speed in addition to generation of the operation signal of the brake pedal and the operation signal of the button.

* * * * *